United States Patent
Dumais et al.

(10) Patent No.: US 7,225,187 B2
(45) Date of Patent: May 29, 2007

(54) SYSTEMS AND METHODS FOR PERFORMING BACKGROUND QUERIES FROM CONTENT AND ACTIVITY

(75) Inventors: Susan T. Dumais, Kirkland, WA (US);
Eric J. Horvitz, Kirkland, WA (US);
Edward B. Cutrell, Seattle, WA (US);
Raman K. Sarin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 10/827,920

(22) Filed: Apr. 20, 2004

(65) Prior Publication Data

US 2004/0267730 A1 Dec. 30, 2004

Related U.S. Application Data

(63) Continuation-in-part of application No. 10/607,228, filed on Jun. 26, 2003, now Pat. No. 7,162,473.

(51) Int. Cl.
*G06F 17/30* (2006.01)
(52) U.S. Cl. .............................................. 707/5; 707/10
(58) Field of Classification Search .................... 707/3, 707/10, 5
See application file for complete search history.

(56) References Cited

U.S. PATENT DOCUMENTS

| | | |
|---|---|---|
| 5,493,692 A | 2/1996 | Theimer et al. |
| 5,544,321 A | 8/1996 | Theimer et al. |
| 5,555,376 A | 9/1996 | Theimer et al. |
| 5,603,054 A | 2/1997 | Theimer et al. |

(Continued)

FOREIGN PATENT DOCUMENTS

CA 2364920 6/2002

(Continued)

OTHER PUBLICATIONS

Dieter Fensel, et al., Oil: An Ontology Infrastructure for the Semantic Web, The Semantic Web, Mar./Apr. 2001, pp. 38-45.

(Continued)

*Primary Examiner*—John Cottingham
*Assistant Examiner*—Kuen S. Lu
(74) *Attorney, Agent, or Firm*—Amin, Turocy & Calvin, LLP

(57) ABSTRACT

Most information retrieval systems start with a user's explicit query. Systems and methods are provided that perform implicit or background queries to one or more information sources based on the ongoing activities of users. The methods provide users with the results of such automated contextualized searches in an unobtrusive manner. In one aspect, implicit queries are run when users are reading, working on or composing an application. Queries can be automatically generated by analyzing an application, and results can be presented in a variety of peripheral display configurations, including a small pane adjacent to a current window to provide peripheral awareness of related information that is automatically determined from existing user context and/or related content from the application. The invention includes methods for building models that predict the value of different queries, and of the results generated by such queries, based on logged data, and for using such models to control query formulation and to mediate decisions about displaying the results of implicit queries.

35 Claims, 10 Drawing Sheets

U.S. PATENT DOCUMENTS

| | | | |
|---|---|---|---|
| 5,611,050 | A | 3/1997 | Theimer et al. |
| 5,778,378 | A | 7/1998 | Rubin |
| 5,812,865 | A | 9/1998 | Theimer et al. |
| 6,230,172 | B1 | 5/2001 | Purnaveja et al. |
| 6,271,840 | B1 | 8/2001 | Finseth et al. |
| 6,278,992 | B1 | 8/2001 | Curtis et al. |
| 6,278,993 | B1* | 8/2001 | Kumar et al. ............... 707/3 |
| 6,321,228 | B1* | 11/2001 | Crandall et al. ............ 707/10 |
| 6,446,035 | B1 | 9/2002 | Grefenstette et al. |
| 6,466,232 | B1 | 10/2002 | Newell et al. |
| 6,493,718 | B1 | 12/2002 | Petculescu et al. |
| 6,513,046 | B1 | 1/2003 | Abbott, III et al. |
| 6,546,388 | B1 | 4/2003 | Edlund et al. |
| 6,549,915 | B2 | 4/2003 | Abbott, III et al. |
| 6,557,042 | B1 | 4/2003 | He et al. |
| 6,605,120 | B1 | 8/2003 | Fields et al. |
| 6,615,258 | B1 | 9/2003 | Barry et al. |
| 6,745,178 | B1* | 6/2004 | Emens et al. ............... 707/3 |
| 6,747,675 | B1 | 6/2004 | Abbott et al. |
| 6,789,115 | B1 | 9/2004 | Singer et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,819,339 | B1* | 11/2004 | Dowling ................. 715/738 |
| 6,842,877 | B2 | 1/2005 | Robarts et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0010679 | A1 | 1/2002 | Felsher |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0014399 | A1 | 1/2003 | Hansen et al. |
| 2003/0028631 | A1 | 2/2003 | Rhodes |
| 2003/0046401 | A1 | 3/2003 | Abbott et al. |
| 2003/0055827 | A1* | 3/2003 | Keohane et al. ............. 707/10 |
| 2003/0061209 | A1 | 3/2003 | Raboczi et al. |
| 2003/0135612 | A1 | 7/2003 | Huntington et al. |
| 2003/0154476 | A1 | 8/2003 | Abbott, III et al. |
| 2003/0177111 | A1 | 9/2003 | Egendorf et al. |
| 2003/0182310 | A1 | 9/2003 | Charnock et al. |
| 2003/0227487 | A1 | 12/2003 | Hugh |
| 2004/0001104 | A1 | 1/2004 | Sommerer et al. |
| 2004/0215608 | A1* | 10/2004 | Gourlay ..................... 707/3 |
| 2004/0267730 | A1 | 12/2004 | Dumais et al. |
| 2005/0034078 | A1 | 2/2005 | Abbott et al. |

FOREIGN PATENT DOCUMENTS

| | | |
|---|---|---|
| EP | 0497479 A1 | 8/1992 |
| WO | 9800787 | 1/1998 |
| WO | WO 98/32289 | 7/1998 |

OTHER PUBLICATIONS

Lipyeow Lim, et al., Dynamic Maintenance of Web Indexes Using Landmarks, Proceedings of the Twelfth Internaitonal Conference on World Wide Web, May 20-24, 2003, pp. 102-111, Budapest, Hungary.

Tetsuya Sakai, et al., Generic Summaries for Indexing in Information Retrieval-Detailed Test Results, Proceedings of the 24th Annual International ACM SIGIR Conference, pp. 190-198, 2001.

Andy Harter, et al., A Distributed Location System for the Active Office, IEEE Network, 1994, pp. 62-70.

Guangling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994, pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information. In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces. Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

E. Adar, et al. Haystack: Per-user Information Environments. In Proc. of CIKM '99, pp. 413-422, 1999.

J. Anderson, et al. Reflections of the Environment in Memory. Psychological Science, vol. 10, pp. 396-408, 1991.

D. Barreau and B. Nardi. Finding and Remembering: File Organization from the Desktop. SIGCHI Bulletin, vol. 27 No. 3, 1995. 5 pages.

V. Bellotti and I. Smith. Informing the Design of an Information Management System with Iterative Fieldwork. Proc. of DIS '00, pp. 227-237, 2000.

A. Broder, et al. Graph Structure in the Web. In Proc. of the 9th International WWW Conference, pp. 309-320, 2000.

Q. Burrell. A Simple Stochastic Model for Library Loans. Journal of Documentation, vol. 36 No. 2, pp. 115-132, 1980.

V. Bush. As We May Think. Atlantic Monthly, vol. 176, pp. 101-108, 1945.

V. Bush. Science is Not Enough. Chapter: Memex Revisited, pp. 75-101. New York: William Morrow.

L. Catledge and J. Pitkow. Characterizing Browsing Strategies in the World Wide Web. In Proc. of the 3rd International WWW Conference, 1995. 10 pages.

A. Cockburn and S. Greenberg. Issues of Page Representation and Organization in Web Broswers Revisitation Tools. In Proc. of OzCHI '99, pp. 7-14, 1999.

P. Dourish, et al. Presto: An Experimental Architecture for Fluid Interactive Document Spaces. ACM Transactions on Computer-Human Interaction, vol. 8 No. 2, pp. 133-161, 1999.

T. Erickson. The Design and Long-term use of a Personal Electronic Notebook: A Reflective Analysis. Proc. of the ACM CHI 96 Conference on Human Factors in Computing Systems, pp. 11-18, 1996.

S. Fertig, et al. Lifestreams: An Alternative to the Desktop Metaphor. In Proc. of ACM CHI 96 Conference on Human Factors in Computing, pp. 410-411, 1996.

S. Greenberg. The Computer User as a Toolsmith: The use, reuse, and organization of computer-based tools. Cambridge, MA: Cambridge University Press. 198 pages.

D. Huynh, et al. Haystack: A Platform for Creating, Organizing, and Visualizing Information using RDF. Semantic Web Workshop 2002. 10 pages.

W. Jones, et al. Keeping Found Things Found on the Web. In Proc. of CIKM 2001, pp. 119-126, 2001.

W. Jones, et al. Once Found What Next? A Study of "Keeping" Behaviors in the Personal Use of Web Information. ASIST 2002. 12 pages.

S. Jones and P. Thomas. Empirical Assessment of Individuals' Personal Information Management Systems. Behaviour and Information Technology, vol. 16 No. 3, pp. 158-160, 1997.

S. Kaasten and S. Greenberg. Integrating Back, History, and Bookmarks in Web Browsers. In Proc. of ACM Conference on Human Factors in Computing Systems, pp. 379-380, 2001.

S. Kaasten, et al. How People Recognize Previously Seen WWW Pages from Titles, URLs, and Thumbnails. In Proc. of Human Computer Interaction 2002, pp. 247-265.

T. Malone. How do People Organize their Desks? Implications for the Design of Office Information Systems. ACM Transactions on Office Information Systems, vol. 1 No. 1, pp. 99-112, 1983

H Marais and K. Bharat. Supporting Cooperative and Personal Surfing with a Desktop Assistant. Proceedings of UIST 1997, pp. 129-138.

B. McKenzie and A. Cockburn. An Empirical Analysis of Web Page Revisitation. In Proc. of the 34th International Conference on System Science, 2001. 9 pages.

B. Nardi, et al. Integrating Communication and Information through ContactMap. Communications of the ACM, vol. 45, pp. 89-95, 2002.

J. Pitkow and P. Pirolli. Life, Death, and Lawfulness on the Electronic Frontier. In Proc. of ACM CHI 97 Conference on Human Factors in Computing Systems, pp. 383-390, 1997.

M. Recker and J. Pitkow. Predicting Document Access in Large, Multimedia Repositories. Georgia Tech, Tech Report, Aug. 23, 1994. 24 pages.

C. Silverstein, et al. Analysis of a Very Large Alta Vista Query Log. SRC Technical Note 1998-014, Oct. 26, 1998. 18 pages.

A. Spink, et al. Searching the Web: The Public and their Queries. Journal of the American Society for Information Science, vol. 53 No. 2, pp. 226-234, 2001.

L. Tauscher and S. Greenberg. How People Revisit Web Pages: Empirical Findings and Implications for the Design of History Systems. International Journal of Human Computer Studies, Special Issue on WWW Usability. vol. 47 No. 1, pp. 97-138.

S. Whitaker and C. Sidner. Email Overload: Exploring Personal Information Management of Email. Proceedings of ACM CHI 96 Conference on Human Factors in Computing Systems, pp. 276-283, 1996.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser. The Computer for the 21st Century, Scientific American, Sep. 1991, 8 pages.

U.S. Appl. No. 10/607,228, filed Jun. 26, 2003, Lu.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Biswajit Samanta, et al., Sparse Data Division Using Data Segmentation and Kohonen Network for Neural Network and Geostatistical Ore Grade Modeling in Nome Offshore Placer Deposit, Natural Resources Research, vol. 13, No. 3, Sep. 2004, pp. 189-200.

Lucio Soibelman, et al., Data Preparation Process for Construction Knowledge Generation Through Knowledge Discovery in Databases, Journal of Computing in Civil Engineering, Jan. 2002, pp. 39-48.

Etzard Stolte, et al., StreamCorder: Fast Trial-and-Error Analysis in Scientific Databases, Proceedings of the 18th International Conference on Data Engineering (ICDE '02), IEEE Computer Society 2002, 2 pages.

* cited by examiner

SYSTEMS AND METHODS FOR PERFORMING BACKGROUND QUERIES FROM CONTENT AND ACTIVITY

RELATED APPLICATIONS

This application is a continuation-in-part of U.S. patent application Ser. No. 10/607,228 filed on, Jun. 26, 2003 now U.S. Pat. No. 7,162,473 and entitled SYSTEMS AND METHODS FOR PERSONAL UBIQUITOUS INFORMATION RETRIEVAL AND REUSE, the entire contents of which are herein incorporated by reference.

TECHNICAL FIELD

The present invention relates generally to computer systems, and more particularly to systems and methods that facilitate automated information retrieval of data during background operations of an application and in the context of ongoing computing activities.

BACKGROUND OF THE INVENTION

One common problem for many search systems is that users first have to explicitly determine and define search criteria before actual searching can commence. Crafting appropriate queries based on an information need can be a difficult task for many users. Another problem is that users will often not think to search for information related to their current task as their attention is focused on the specifics of displayed content or explicit goals at hand.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides methods for automatically generating queries and providing a user with potentially valuable information proactively in the background based on user activity, thus relieving the user from having to specify a query. The queries resulting from an automated analysis of content and activity may be richer and more effective than users would have generated on their own. The queries can be matched against personal or public databases that contain potentially relevant materials. Search results can be presented to the user in the context of ongoing work, thus providing peripheral awareness of task-relevant information without distracting from the current task.

In another aspect, the present invention relates to systems and methods that automatically search for related information based on a user's context. The context can include the content or state of applications that have recently been or are currently in use, as well as previous history of search and browsing. Background search capabilities are facilitated by composing queries to a general search engine(s) which can include a personal index as well as other databases such as the Internet. The systems and methods may provide to users, via a method of rendering information, related search results in a non-invasive manner while users are working, based on the content at focus, and at recent activities and interactions. Other aspects include providing a user with the means to provide input about queries and/or results. For example, users are provided with a means of scoping or selecting alternative available queries, thus allowing users to "try another" query, if desired. This can include ongoing learning and tuning from populations of users via logging or learning from single users for personalization via explicit profile management and/or logging activities. Other aspects include grouping similar results per topic or category, and processing richer notions of context beyond content at focus such as considering other content or activities. Models can be developed for estimating the value of a query and suppressing rendering of the query or search results when it has been determined that the results are not likely to be useful or that the user is currently too busy to spend time reviewing the results of such a background query.

Most information retrieval systems are designed as standalone applications that require users to pause work on their primary activity in order to search. In one aspect, a background querying system, we refer to as an implicit query (IQ) system finds and presents information in the context of ongoing work activities of a user. Queries can be automatically generated in the background based on user activity, and results presented to the user in the context of ongoing work. Implicit query focuses on supporting users in tasks such as email, for example where the context is rapidly changing. In addition, retrieval algorithms and user interface considerations provide a means of presenting results in a manner aimed at maximizing the value while minimizing the disruptiveness of the background results, allowing users to receive the benefits of potentially valuable results if they should attend to the display. The display of results from implicit query provides users with the results of background searches in an unobtrusive and lightweight manner. Results are visible if users decide to glance at them, but they are otherwise non-distracting. Also, queries can be generated via considerations about a user's indexed personal content, and can be matched against personal content (e.g., Stuff I've Seen), which is useful for ongoing searches of related information.

The present invention also facilitates information use and reuse by enabling users to find or retrieve information in a substantially efficient manner. Various components such as an automated indexing tool and user interface provide functionality for automatically indexing previously accessed or considered information and presenting the information to a user in a cognitively relevant manner. In one aspect, the present invention searches a unified index of information that a person has observed, whether it be email, web pages, office documents, calendar appointments, and so forth. In another aspect, since the retrieved information is familiar to the user, rich contextual cues such as date, author, thumbnails and previews are provided with retrieved items that are especially helpful in quickly recognizing items.

In yet other aspects of the present invention, an automated event architecture can be provided that monitors user activities and records events relating to when information has been accessed or seen by the user (e.g., monitor desktop mouse and keyboard activities and record index event when user selects or contemplates an information item).

The present invention can be componentized into a set of modules that communicate among one another through well-defined programming interfaces, so that basic infrastructural modules that perform indexing and retrieval can communicate with different kinds of user interfaces and services. The user interface innovations of the present invention provide rich environments for querying indexed information and displaying the information in a plurality of relevant contexts and with a variety of display metaphors. Displays can include timeline visualizations, wherein retrieved items are arranged and displayed according to time along with memorable or landmark events of the user (e.g., holiday, birthday, September 11, and so forth). In another aspect of the present invention, a concept known as "useful date or time" can be applied to display the cognitively useful date for different resources (e.g., received date is very useful for e-mail messages, but for meeting requests and appointments the date the meeting occurs is better). Other visualizations include ranked lists, grouped lists and grid visualizations that summarize search results by attributes such as people, topics, and time. Although information can be indexed based upon past observances of the user, the present invention can also provide information regarding items the user may want to see in the future (e.g., search for messages that are relevant to a particular context (e.g., retrieve messages sent by those attending past meeting who are invited to upcoming meeting—in addition, provide messages related to past meeting)).

Still yet other aspects of the user interface include various input and query options for efficiently locating information. This can include explicit queries, implicit queries, context-sensitive queries, considerations of application context, and item-centric integrations when displaying, retrieving, and/or manipulating items. As can be appreciated, the automated indexer and user interface can be provided on a client machine such as a desktop application, administered from a centralized server, and/or executed as combinations thereof.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
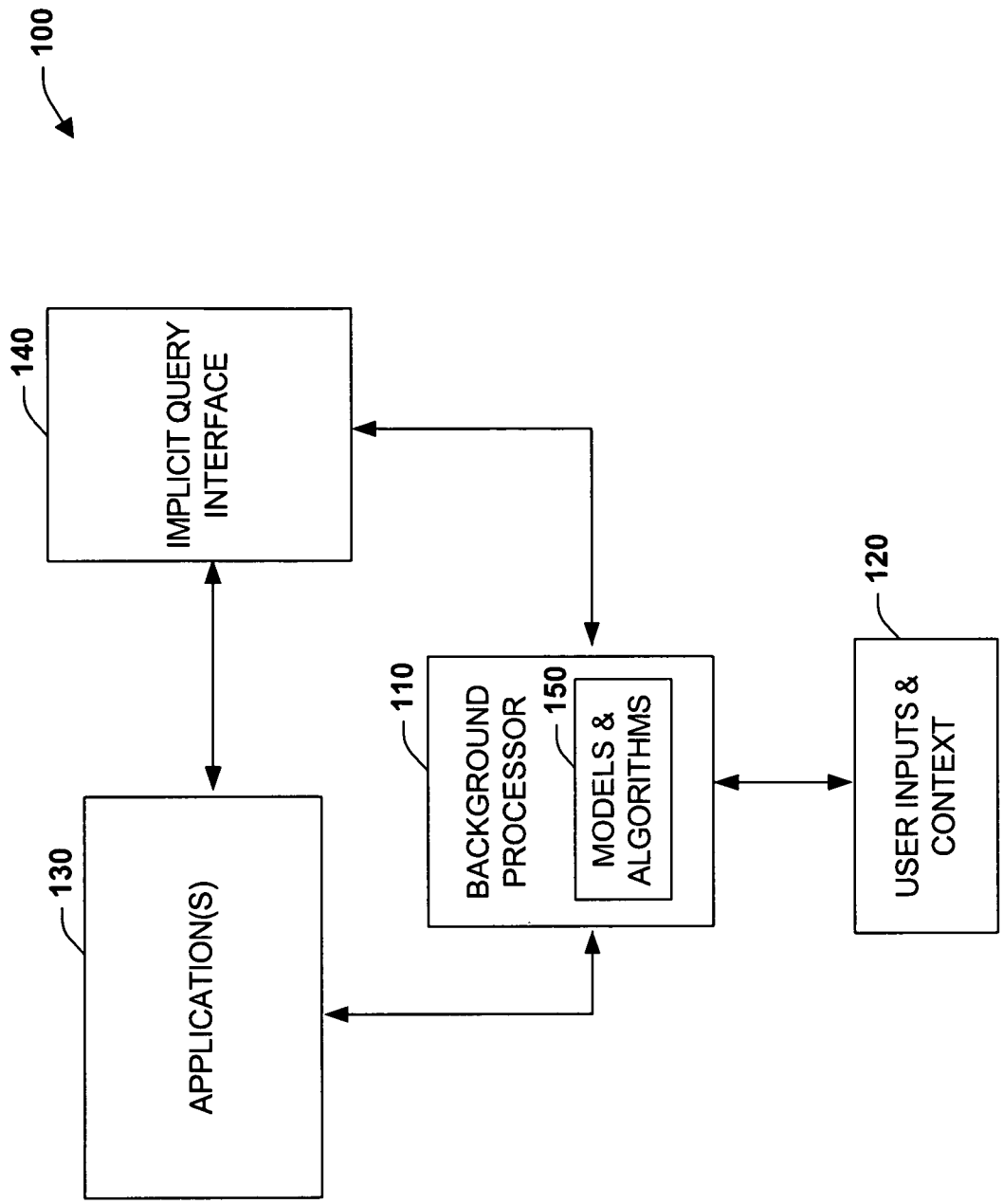
FIG. 1 is a schematic block diagram illustrating an implicit query information retrieval system in accordance with an aspect of the present invention.

The present invention relates to systems and methods relating to implicit or background queries for contextualized searches. Most information retrieval systems start with a user's explicit query. Implicit query (IQ) refers to systems and methods in which context-sensitive searches are automatically generated based on ongoing computing activities. In one aspect, implicit queries run when users are reading or composing information such as e-mail, for example. Thus, queries can be automatically generated by analyzing an email message or other application, and results can be presented in a small pane adjacent to a current window to provide peripheral awareness of related information.

Information items from a plurality of disparate information sources can be automatically searched and a user interface provided to efficiently present the items in a cognitively relevant manner. Various display output arrangements are possible for the retrieved information items including enhanced list views, timeline visualizations and multidimensional grid visualizations. Input options include explicit and implicit queries for retrieving data. In one aspect, an automated system is provided that facilitates concurrent searching across a plurality of information sources. A usage analyzer determines if, when, and, in some cases, how a user accessed items and stores subsets of data corresponding to the items, including the time, and access method, wherein at least two of the items may be associated with disparate information sources, respectively. A search component responds to a search query, initiates a search, and outputs links to locations of a subset and/or provides sparse representations of the subset.

As used in this application, the terms "component," "analyzer," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context, action or event, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, an implicit query information retrieval system 100 is illustrated in accordance with an aspect of the present invention. The system 100 includes a background processor 110 that analyzes user inputs and context 120 while users are operating one or more applications 130. While the applications 130 are being accessed or focused-on by the user, the background processor analyzes data appearing in the applications in view of the user's current context 120 in order to perform background or implicit query searches for related information. Such related information can be provided to the user in an associated implicit query interface 140. Various models and algorithms 150 can be provided to assist the background processor to determine relevant or related information to search and possibly display to the user via the implicit query interface 140. It is noted that the implicit query interface 140 can be associated with an application 130 such as being attached to a border of the application or can appear in substantially any location in a display, wherein the interface may also identify the respective application to which it applies. Also, context information 120 can be obtained from a plurality of sources such as a calendar, detected application activities, detected application content, a log of previous activities, an explicit profile, a microphone and/or camera, face recognition technology, telephone or cell phone activity, and so forth. Such context can be employed to determine via a context model a user's current focus of attention or determine what types of information may be most relevant to the query based upon the user's current task at hand (e.g., typing email to a close friend may focus query on more personal information such as stored images of collaborative encounters).

Background search capabilities can be achieved by the background processor 110 by composing queries to a general search engine(s) (not shown) across a personal index as well as other databases such as the Internet. The processor 110 pushes interesting related search results to users at the implicit query interface 140 in a non-invasive manner while users are working, based on the content at focus in the application 130, and recent activities and interactions. Other aspects include generating and presenting alternative available queries to users and allowing users to "try another" query, if desired. Such queries can be directly shared with users, explained in detail to users, or can remain as an embedded set of options, revealed to users via a "try another" option. An IQ system can include machinery in support of ongoing learning and tuning from populations of users via data logging operations or learning from single users for personalization via explicit profile management and logging activities. Other aspects include grouping similar results per topic or category, and processing richer notions of context beyond content at focus such as considering other content or activities such as in accordance with other applications 130 that may also be on the user's desktop.

The models 150 can be developed for estimating the value of alternate queries in different contexts, so as to guide the automated construction of queries. Models can also be used to predict the expected value of the results of background queries, taking into consideration the multiple classes of evidence, including the content, user activities, query, and the nature of the content of the results. Such models, when implemented in a running system can be relied on to make decisions about whether to render results. Such predictive models can provide value by suppressing the rendering of the results when they are estimated to be of poor quality, or not worth bothering the user with given the current workload of the user. Also, beyond decisions about whether to render information now or never, components can be provided that capture context and potentially valuable results, and that provide renderings of summaries of results at later times, e.g., when the user is less busy. Such models can be statistical models, including statistical regression, Bayesian dependency models, Hidden Markov Models, and Support Vector Machines, which infer or determine the best search criteria for use in formulating queries, and to predict whether particular results are most likely to be valuable given the long-term and short-term views on content or creation of content, and other activities of users.

Figure 2:
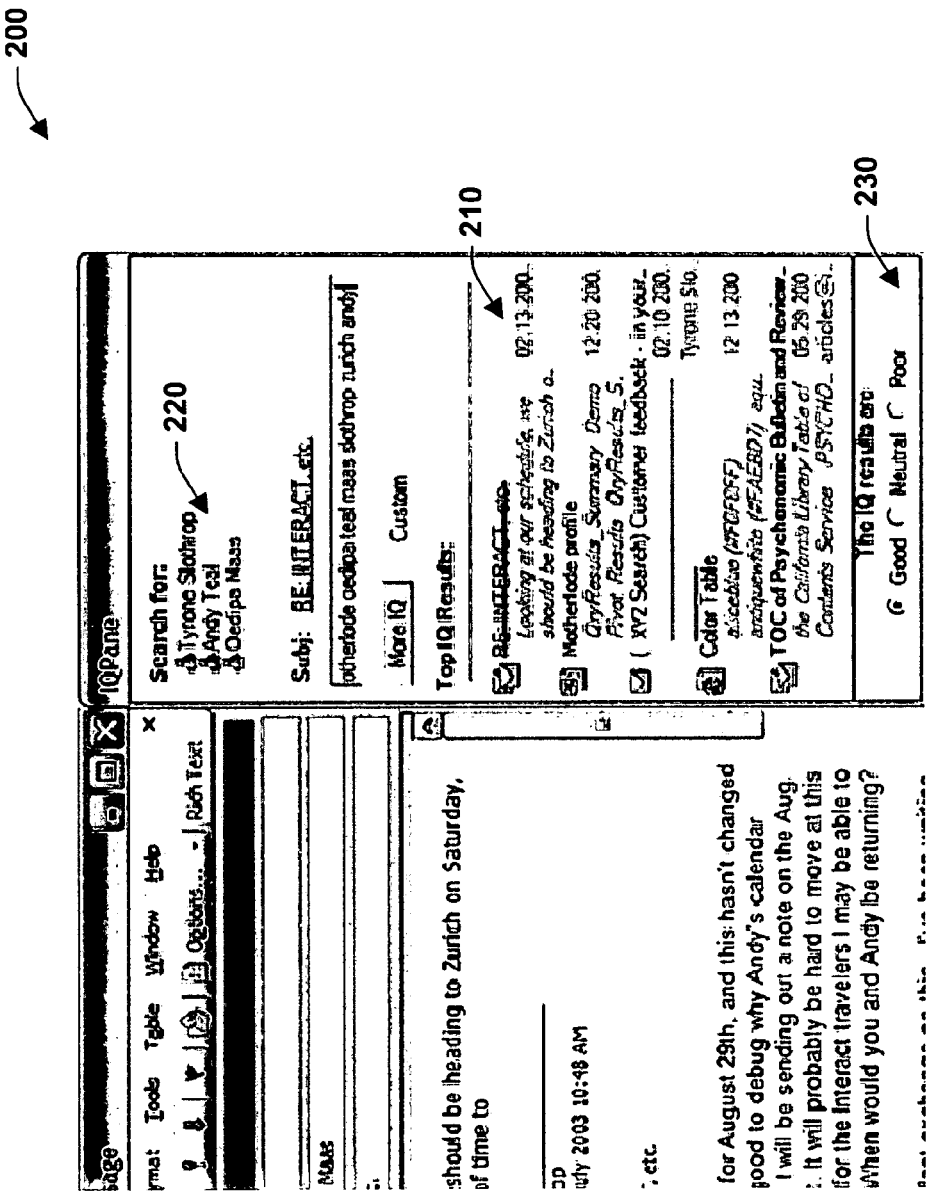
FIG. 2 is an exemplary implicit query interface pane in accordance with an aspect of the present invention.

Referring now to FIG. 2, an exemplary implicit query interface pane 200 is illustrated in accordance with an aspect of the present invention. In this aspect, and with respect to FIGS. 3–5 below, an email application is illustrated for exemplary purposes, however, it is to be appreciated that the implicit query concepts described herein can be applied to substantially any application that can be interacted with by users (e.g., Word, Power Point, Spread Sheet, Code Development Application, Internet Explorer, and so forth). With respect to the implicit query interface 200 of FIG. 2, this example version of implicit query demonstrates an email plug-in that analyzes what a user is reading or composing and automatically finds related items in an index of information (personal or non-personal) which includes mail, calendar appointments, web pages, files, IM messages, and so forth. New wrappers can be written to analyze context from other applications and to retrieve information from other data sources (e.g., intranets, internet, databases). Search results are shown in a sidebar 210 attached to the current email or application, which allows users to maintain their task focus and take advantage of peripherally-presented suggestions. In addition to basic search results, the implicit query interface 200 displays quick links to related people and topics at 220. Query results can be obtained from several alternative retrieval algorithms that are readily available. Users can also control presentation parameters (e.g., refresh delay, transparency), and can be provided feedback about the quality of the results at 230 (e.g., good, neutral, poor).

Figure 3:
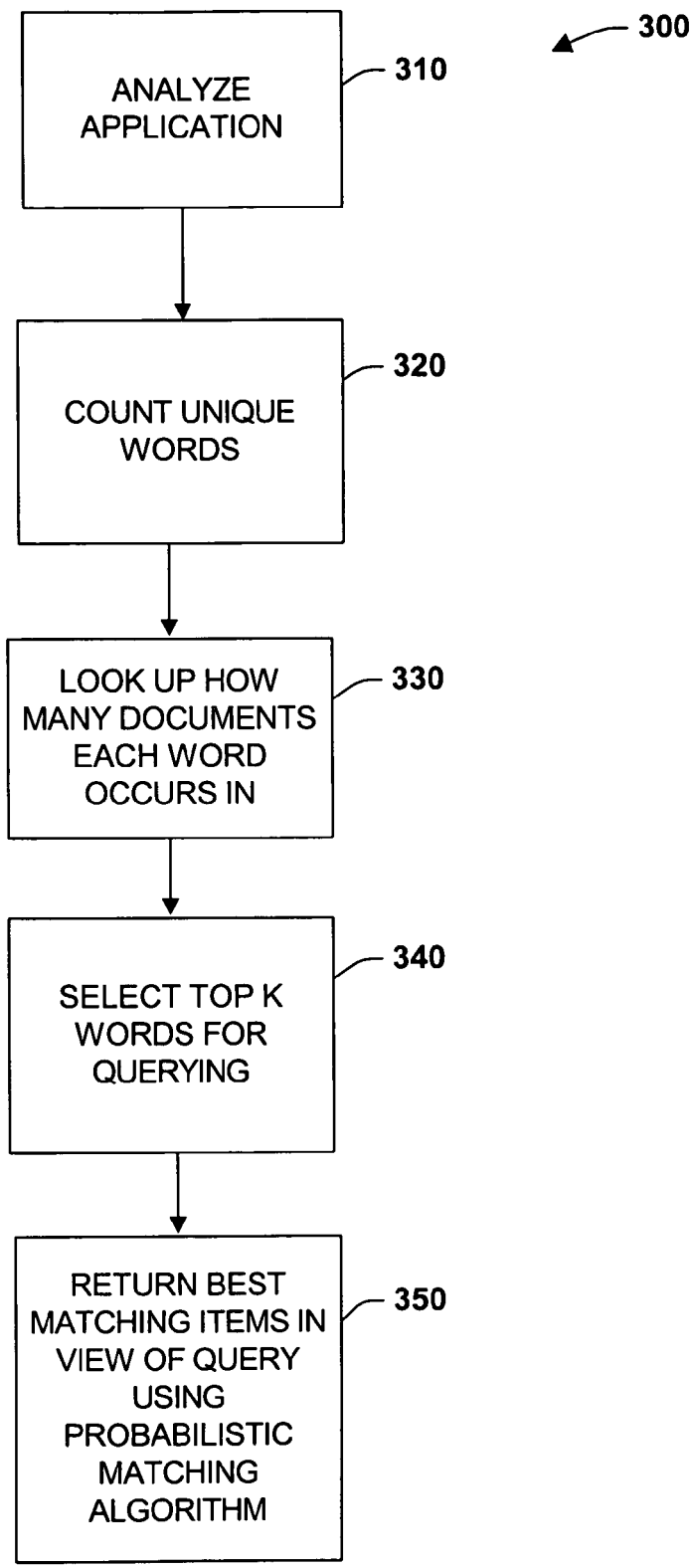
FIG. 3 is a flow diagram illustrating an implicit query process in accordance with an aspect of the present invention.

FIG. 3 is a methodology 300 illustrating implicit query processing in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Although the following process 300 is described with respect to an email application, it is to be appreciated that other applications can employ implicit query processing in accordance with the present invention. Queries are automatically generated in the background based on relevant user activity. Proceeding to 310, an email message that is being read or composed is analyzed. It is noted that the text analysis generally occurs in real time and thus, queries can change as new words are added or deleted to an email being composed or if the corpus changes significantly. At 320, unique words and phrases in the message or application are counted. At 330, a look up is performed on how many different documents each word occurs in a local or remote index. Each word is assigned a score using a combination of the frequency of occurrence in the current application (320) and/or the frequency of occurrence in the index (330). One function assigns a score that is proportional to the frequency of occurrence of the word in the current application and inversely proportional to the frequency of occurrence of the word in a larger corpus (e.g., the index). Another function assigns a score that is a monotonically increasing function of the frequency of occurrence of the word in the current application and inversely proportional to a monotonically increasing function of the frequency of occurrence of the word in a larger corpus (e.g., the index). At 340, the top k scored words or all words above a threshold are selected as query words. At 350, given a query based on the top k words, the best matching items from a local or remote index are retrieved. This can include using a probabilistic matching algorithm to determine the search results that are most likely relevant to the activity at hand (e.g., results determined to be above a threshold of relevance are returned). Other attributes in addition to match score can be used to order the results rendered (e.g., time, author, document type, subject). Other aspects of the process 300 include allowing the names of all (or a subset) of people involved in the email to be explicitly added as query terms. Also, the subject of the email can be explicitly added as query terms. Filtering policies can also be implemented such as a setting that only emails are to be returned or only documents are to be returned.

Figure 4:
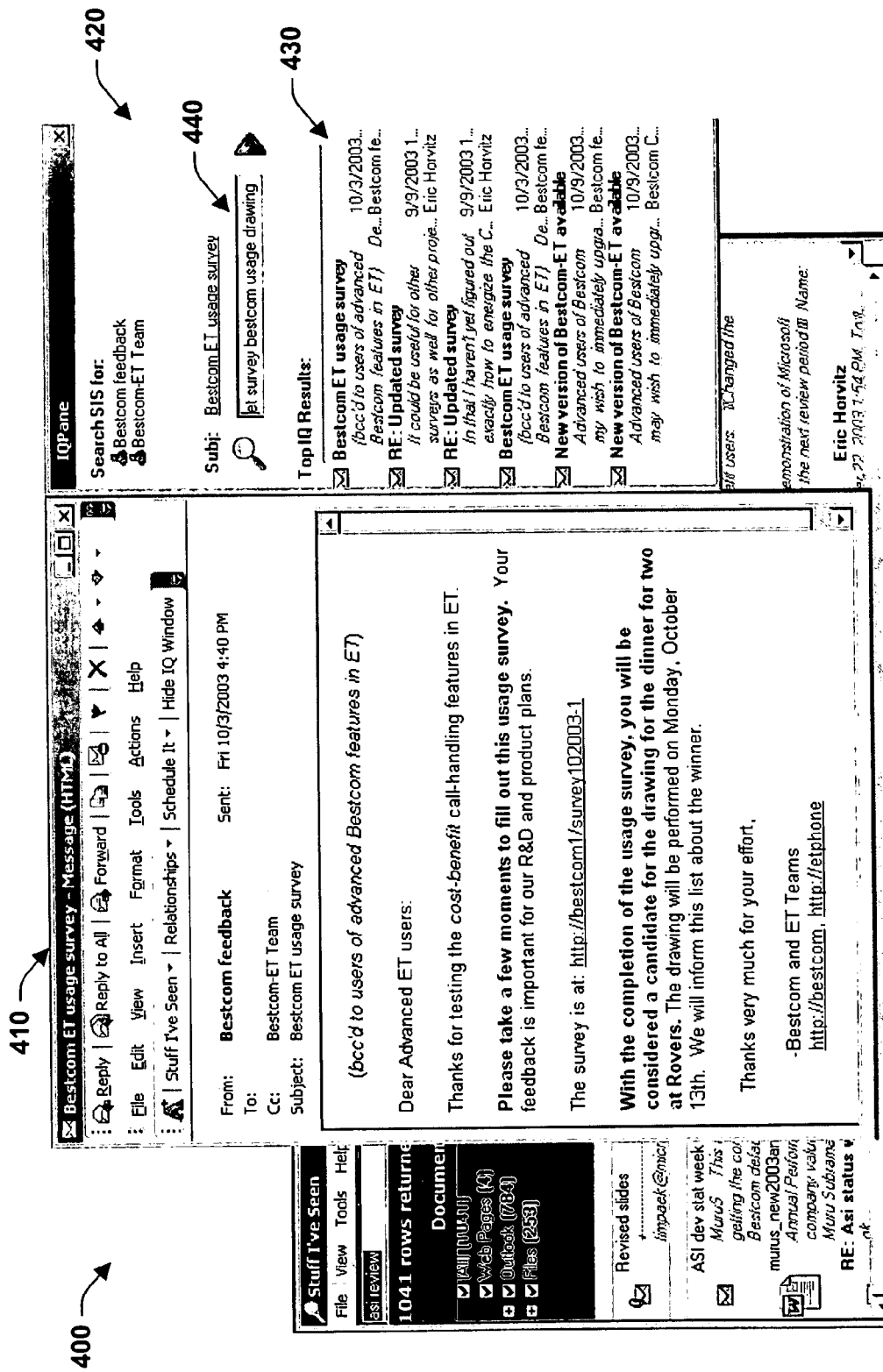
FIGS. 4 and 5 are exemplary implicit query interfaces in accordance with an aspect of the present invention.
Figure 5:
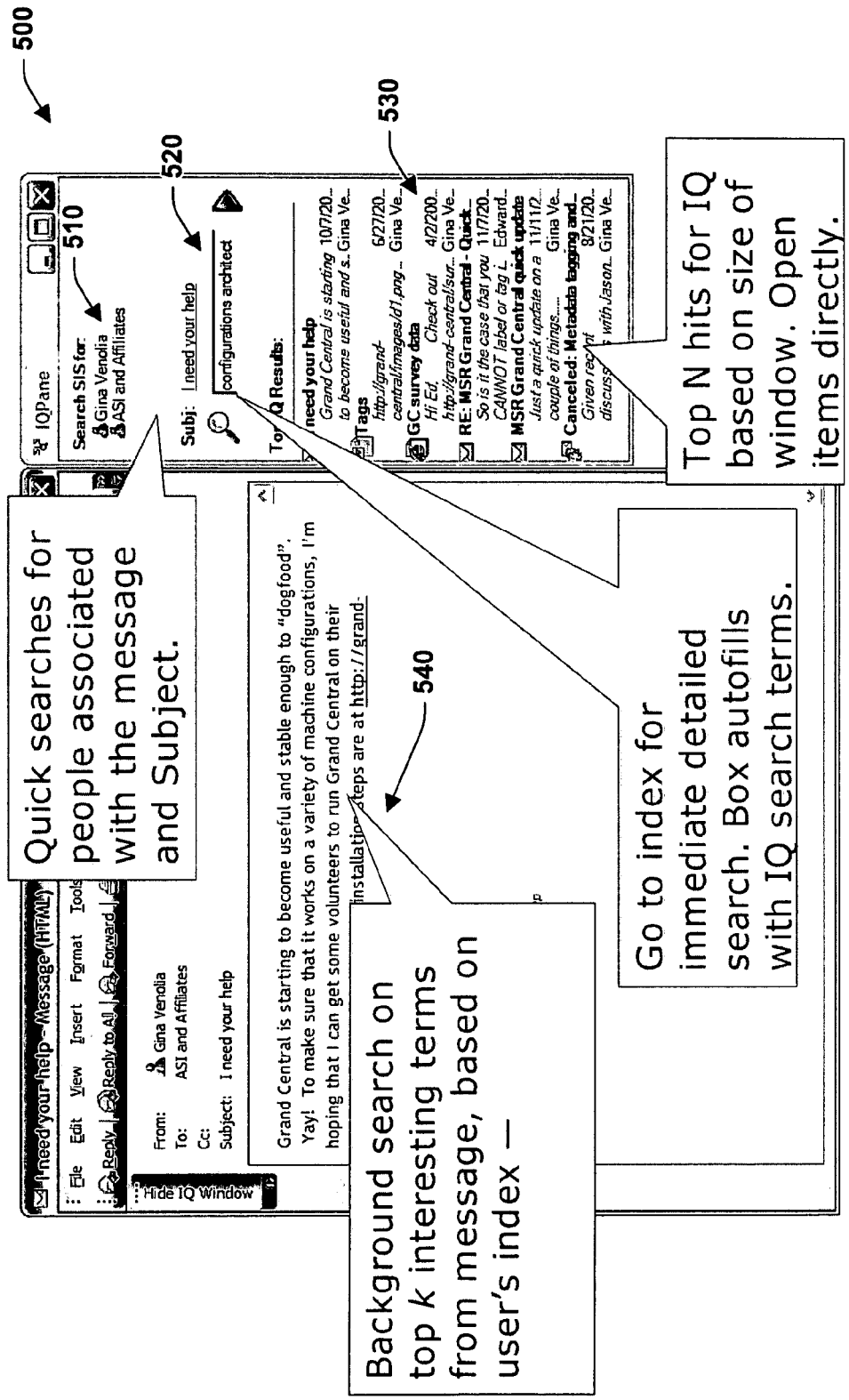

FIGS. 4 and 5 are exemplary implicit query interfaces in accordance with an aspect of the present invention. With respect to FIG. 4, an interface 400 depicts an e-mail application 410 having an associated implicit query interface panel 420. The panel includes a results section 430 which is updated as the query changes. These results are derived from an implicit query 440 that is displayed in real time to the user, which the user can modify or override if desired. As illustrated, the subject matter of the application 410 is related to an example activity called "Bestcom", wherein the query interface panel displays related data or returned results (derived in the background in real time) that are associated with the respective activity.

With respect to FIG. 5, certain exemplary features are highlighted. At 510, quick searches can be initiated by the users by selecting people that are automatically presented in view of current or past activities with an application. At 520, immediate detailed searches can be crafted by users or this area can be left to be filled by real time implicit background queries as described above. At 530, the top N searches are displayed and can be adjustable based upon the size of a respective window (e.g., smaller windows show fewer returned items or provide scrolling options) and items appearing in the window can be directly opened by mouse click, for example. At 540, implicit queries are created based in part upon the top k interesting terms from application content as described above with respect to FIG. 2.

Figure 6:
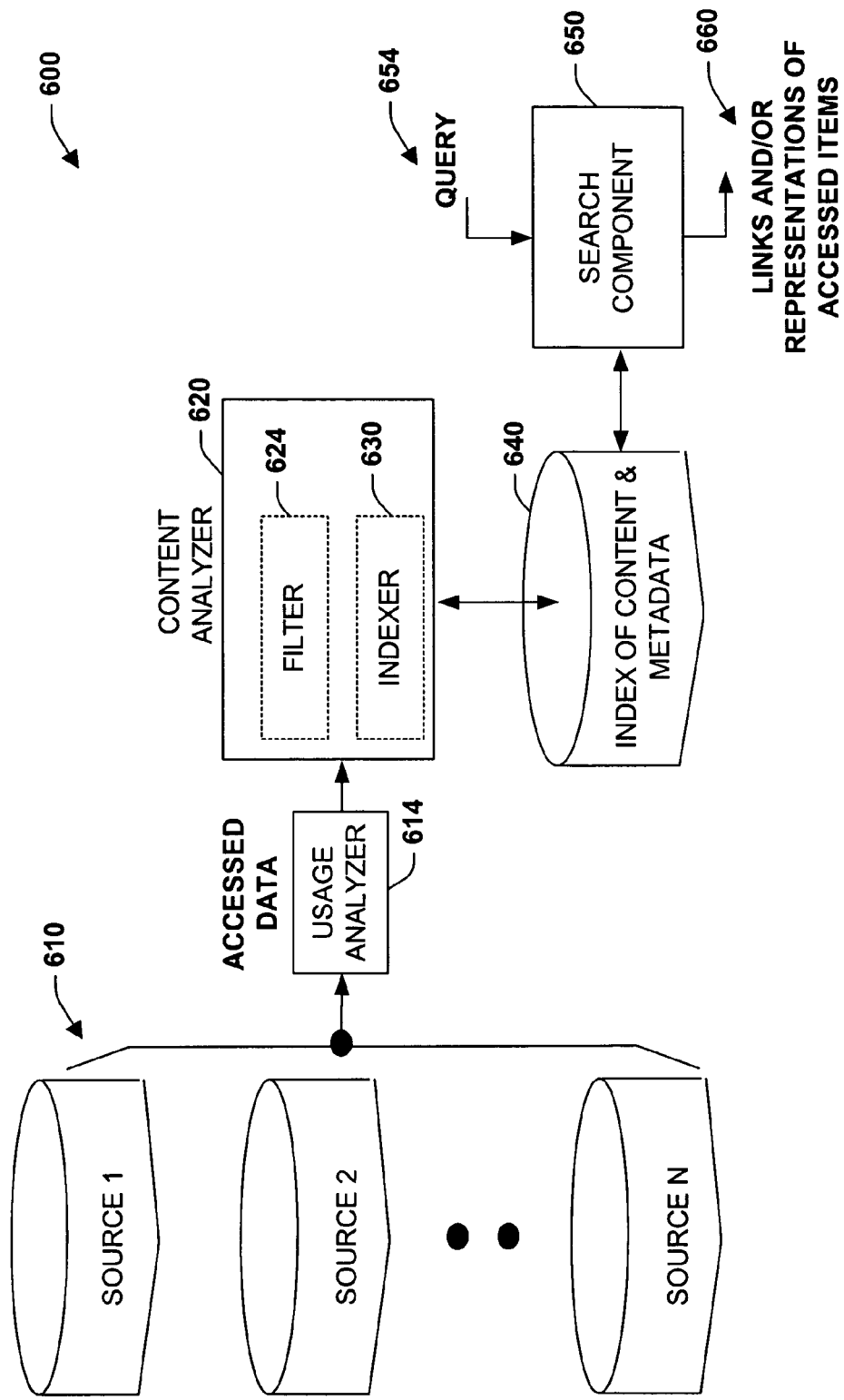
FIG. 6 is a schematic block diagram illustrating access-based information retrieval system in accordance with an aspect of the present invention.

Referring to FIG. 6, a system 600 illustrates access-based information retrieval in accordance with an aspect of the present invention. The system 600 includes one or more information sources 610 that are accessed or considered by a user. These sources 610 can be similar or disparate in nature having dissimilar information content, whereby some of the information sources may represent local data locations such as files, folders, applications, images, audio files, appointments, email, and so forth, and other sources 610 may represent remote sources such as web information, for example. As the user accesses different types of information over time, a usage analyzer 614 passes this information to a content analyzer 620 which can operate as a background task locally on a client machine and/or remotely in accordance with a server, processes the accessed data via a filter 624 for parsing content from data, and an automated indexer 630 that creates a content index 640 of accessed data items.

In general, the analyzer 620 creates sparse representations of accessed data in the content index 640. For example, if the user has accessed a web page, the content analyzer 620 may create a thumbnail representation of the web page and associate a hyperlink reference to the page and thumbnail as part of a metadata file. In another case, if the user then accessed a text document having images contained therein, the analyzer 620 may extract the text or portions thereof, and associate a database link such as a file path as part of metadata. The indexer 630 would then automatically create an index (or add to an existing index) having two items in the content index 640—the thumbnail representation and text document representation including metadata. In general, filters analyze the content of and metadata associated with items. So, for a Word document, for example, the filter 624 extracts metadata such as filename, title, author, keywords, creation date, etc. along with the words in the document. This is what is used to build the index 640. The creation of thumbnails and the analysis of images could also be encapsulated in the filter 624, if desired.

As will be described in more detail below, the metadata may contain other items such as user-created and/or implicit tags that describe the items stored in the content index 640. It is to be appreciated that the indexer 630 may also perform filter 624 functions (e.g., indexer associates metadata with filtered content).

A search component 650 is provided that receives a user query 654 for information items contained in the content index 640. The search component 650 can be provided as part of a user interface (described below) returns links and/or representations of accessed items at 660 to the user in response to the query 654. For example, the user may query for "items relating to last years performance review," wherein the search component 650 extracts items from the content index 640 such as emails, coworker evaluations, documents published in the last year, web page images, audio recordings and so forth relating to the context of the query 654. In another example, an implicit query may be derived from the query 654 (e.g., whenever I get a phone call from this person, pull-up last five e-mails from this person).

As will be described in more detail below, accessed items can be presented in a plurality of differing formats designed to facilitate efficient and timely retrieval of information items that have been previously accessed. Also, the links and/or representations 660 may include other items of interest to the user such as providing information items that the user may want to see other than those items previously accessed (e.g., system provides links to other content of interest based upon or inferred from query at hand, e.g., in addition to showing performance review items, optionally provide links to human resources describing review policies based on another index of content even though these items may or may not have not been previously accessed by the user).

One approach to combining methods for indexing and retrieval of information from a personal store is to also send a submitted query (or an automatically reformulated version of that query) to another search engine in addition to the personal search system, e.g., MSN Search or Google for the accessing resources from the World Wide Web, and to integrate the results from the personal search engine with the other search results in the displayed result list. Gathering results from the personal store and from the outside resources (e.g., the Internet) provide opportunities for display the results from these sources in different ways. For example, a system can mark the search results as coming from a particular source (e.g., from "the Web" or from "cs.stanford.edu on the Web"). The results can be interleaved or returned in a separately marked region of the display (e.g., listed separately in a separate display region, labeled, "From the Web.") By unifying the personal information indexing and retrieval system with other, potentially broader search methods and resources, a personal browsing system can be positioned as a general information portal to all of a user's content and key external resources. The user can use the portal to search on personal information, as well as more general resources, and to decide with the control of parameters, at set up time or in stream with a query, to search across personal, outside resources, or combinations thereof.

In one aspect of the present invention, an event component can be provided (not shown) (e.g., background task that monitors user activities associated with usage analyzer 614). The event component monitors user activities such as saving, reading, editing, copying, hovering on information, selecting information, manipulating information and/or deleting files, for example, and makes determinations with respect to user actions. This can include sensors such as microphones, cameras, and other devices along with monitoring desktop activities to determine user actions or goals. In one example, probabilistic models and/or logical decisions can be applied to determine events such as when a user has observed or contemplated information. Logical and/or statistical models (e.g., Bayesian dependency models, decision trees, Support Vector Machines) can be constructed that consider the following example classes of evidence associated with patterns of user activity:

Focus of attention: Selection and/or dwelling on items, dwelling on portions of a document or on specific subtext after scrolling through a document.

Introspection: A pause after a period of activity or a significant slowing of the rate of interaction.

Undesired information: Immediate closure of a document after a brief glance, attempts to return to a prior state after an information access action. These observations include undoing the effect of recent action, including issuing an undo command, and deleting items.

Domain-specific syntactic and semantic content: Consideration of special distinctions in content or structure of documents and how user interacts with these features or items. These include domain-specific features associated with the task. (e.g., considering that rate and frequency of email messages, and the age in time or number of messages of a subject heading, from the author of a message at a user's focus of attention).

As can be appreciated, the present invention can employ the event component to trigger indexing of various types of information on the basis of user-activity. User's activity with information objects can also be utilized to improve information presentation.

Figure 7:
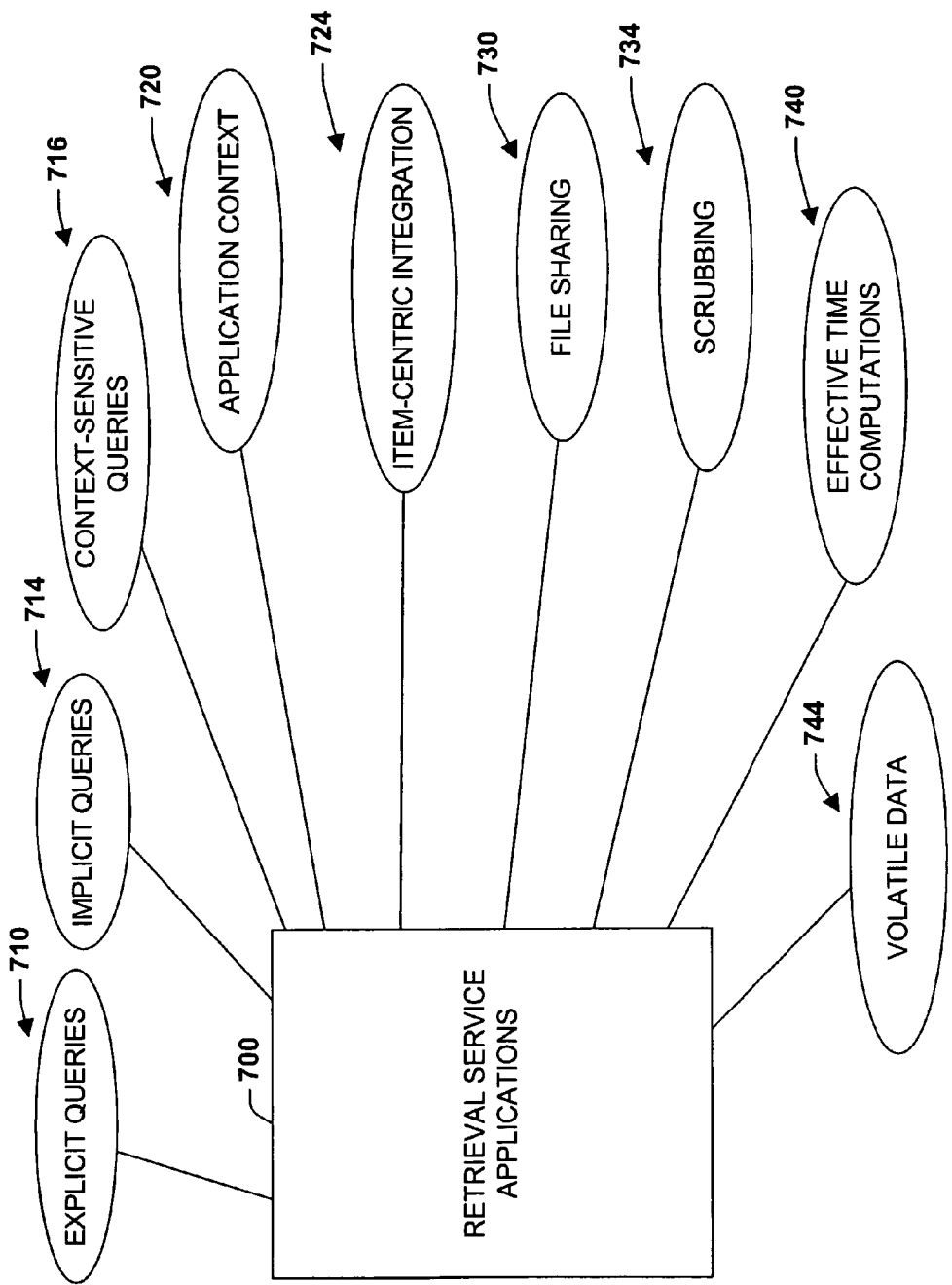
FIG. 7 illustrates retrieval service applications in accordance with an aspect of the present invention.

FIG. 7 illustrates various retrieval service applications 700 in accordance with an aspect of the present invention. As noted above, the present invention supports explicit queries 710 and/or implicit queries 714. Explicit queries 710 are directed by the user to find information of interest (e.g., show all data references relating to a meeting or date). Implicit queries 714 can in some cases be derived from the explicit query 710. For example, a user could have their desktop phone messages linked to their e-mail system or other message system. If a phone call were to arrive from selected individuals, the e-mail system could automatically retrieve e-mail relating to the individual via implicit query 714. In another example, at a predetermined interval before an upcoming meeting, the user's calendar system could trigger queries to recall data from past meetings or information relating to individuals attending the upcoming meeting. Also, implicit queries 714 may be generated based upon reasoning processes associated with the user's current context or query (e.g., a query composed of important words in recently read paragraphs).

Proceeding to 716, other types of queries support context-sensitive queries. These types of queries include providing additional selection options to edit or refine searches. For example, queries may be directed to a particular type of application or location (e.g., apply this query to mail folder only). At 720, the context of an application can be considered when performing a query. For example, if a photo application is being used, then the query can be refined to only search for images. At 724, item-centric integrations can be performed. This includes operating system actions that support interface actions such as mouse click functions, tagging items, updating metadata files, deleting items, editing items or content, and so forth.

At 730, file sharing can be performed in accordance with the present invention. For example, the user may specify that one or more other users can inspect or have access to all or a subset of their query/index database (e.g., all users on my project team are permitted access to my project notes). At 734, index scrubbing can occur. Over time, users may desire to remove one or more items from their index. In accordance with this activity, users can specify specific items to remove or specify general topic areas that can be automatically scrubbed by the system (e.g., remove thumbnails related to my birthday two years ago). Other actions could occur based upon logical or reasoning processes such as if an item were accessed fewer than a certain number of times in a predetermined period, then the item could be automatically removed if desired.

At 740, effective time computations are considered. As an example, the date that's relevant or useful concerning a file (during data presentation to a user) is the date it was changed, the date for presenting mail is usually the date it was delivered (and thus approximately when the user saw it), and the useful date for an appointment is the date the appointment occurs. It is noted that all time information recorded and indexed and that useful date information is utilized for presentation of information. So, for appointments, the present invention indexes the time the mail was sent, the time it was updated (if that happened), the time the user accepted/declines, and the time the meeting occurred, for example. However, typically one time is selected for display although more than one time can be provided.

As noted above, certain data can be marked as having been previously observed by analyzing file elements associated with a file type. For example, a text document may contain a field indicating when a file was open or last edited. With respect to calendar appointments however, merely creating an index from when the calendar was created is likely to be of minor benefit to people because sometimes meetings are created well in advance of the actual meeting date. Thus, when indexing a calendar appointment, the present invention tracks the actual meeting data as opposed to time of creation. This type of effective time consideration enables users to retrieve information in a manner more suited to memory recall. At 744, the volatility of data is considered and processed. This type of processing involves indexing of data into a persistent form during intermittent operations. As can be appreciated, various automated background operations are possible.

Figure 8:
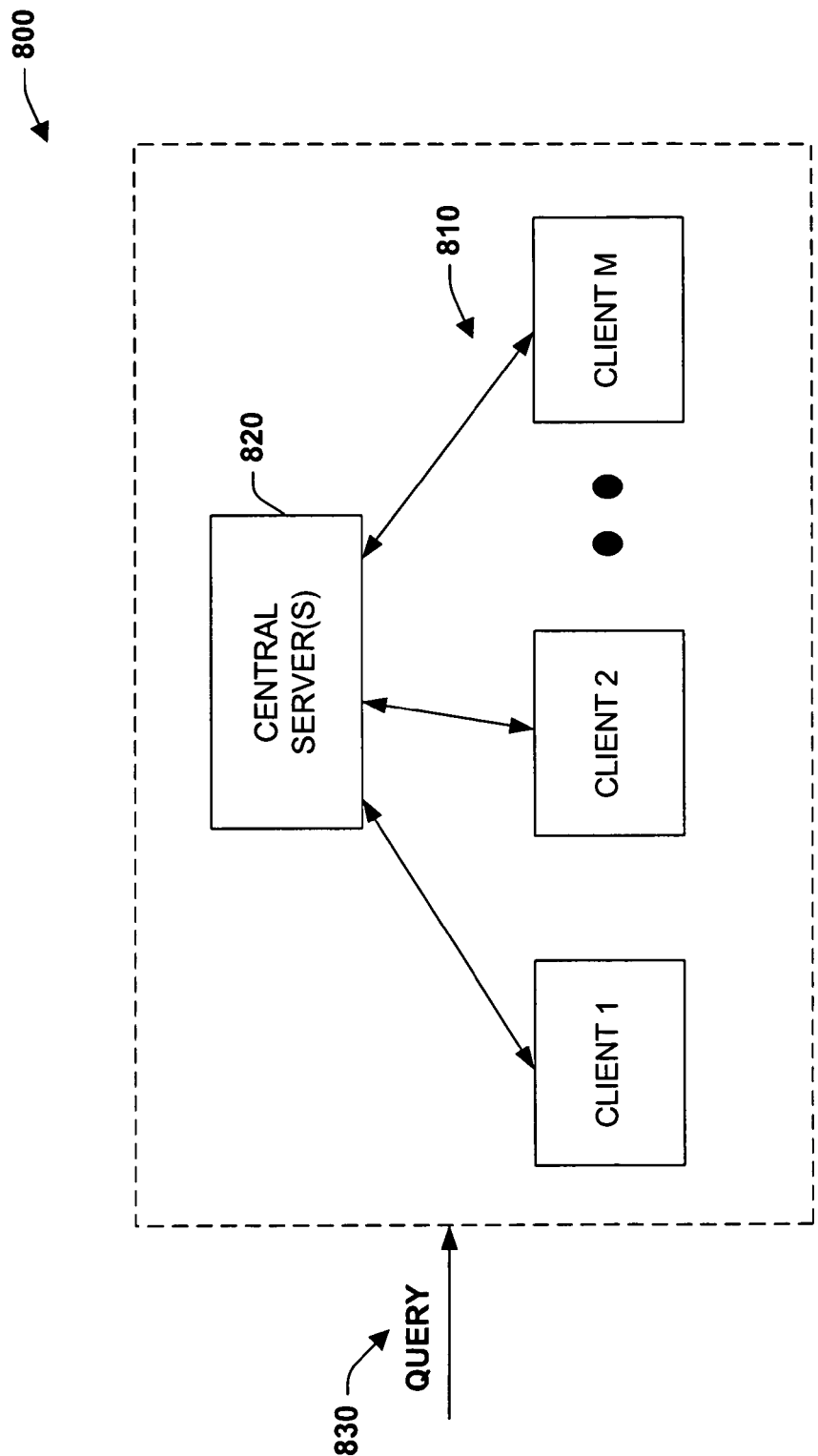
FIG. 8 is a system diagram illustrating a multiple machine execution environment in accordance with an aspect of the present invention.

FIG. 8 is a system 800 illustrating a multiple machine execution environment in accordance with an aspect of the present invention. In this aspect, functions providing indexing, storing, monitoring and querying of observed information can be achieved in a local process environment such as on one or more client machines 810. In another aspect, a centralized server 820 may provide one or more of the above functions. As can be appreciated various combinations of client server functionality can be provided. For example, in one aspect local indexing can occur on the client machines 810, wherein periodic dumps of indexed content are delivered to the server or servers 820. A query 830 is then directed to the server 820 for a comprehensive lookup of past data events collected from the client machines 810. In another aspect, the client machines 810 may receive the query 830, perform a local retrieval, and/or pass the query to the server 820 for other items of interest.

In yet another aspect, a majority of indexing and filtering occurs on the server 820, wherein activity data is collected from the client machines 810 to build a master index at the server. In another aspect, the server 820 may be responsible for building index content and during periodic intervals, dump all or portions of the index down to the client machines 810 to facilitate high speed access of content. When determining how to distribute functionality across machines, it is noted that tradeoffs may occur between indexing time versus distributed processing time (e.g., localized queries may be faster but centralized queries provide access to larger databases).

Figure 9:
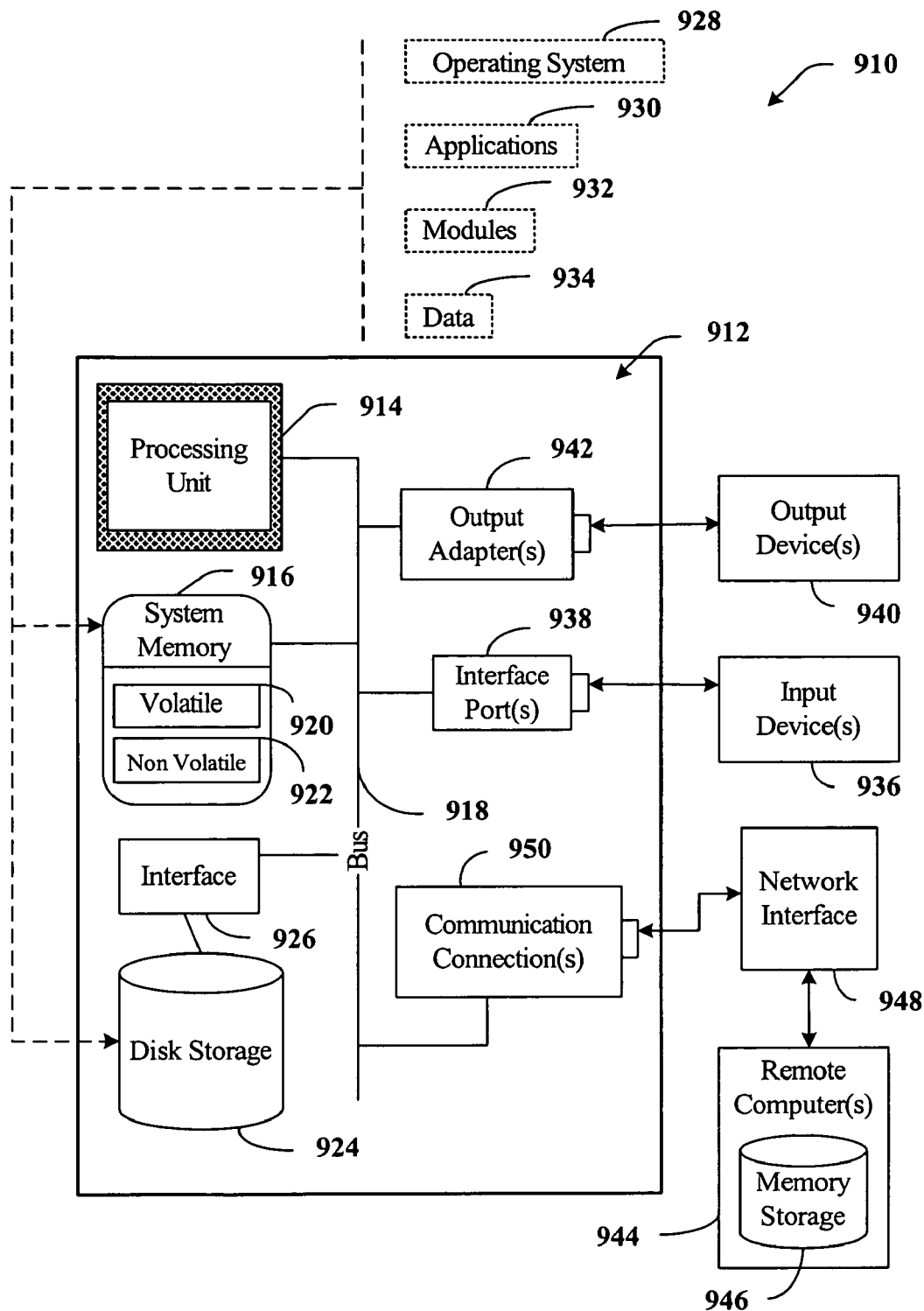
FIG. 9 is a schematic block diagram illustrating a suitable operating environment in accordance with an aspect of the present invention.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 9940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
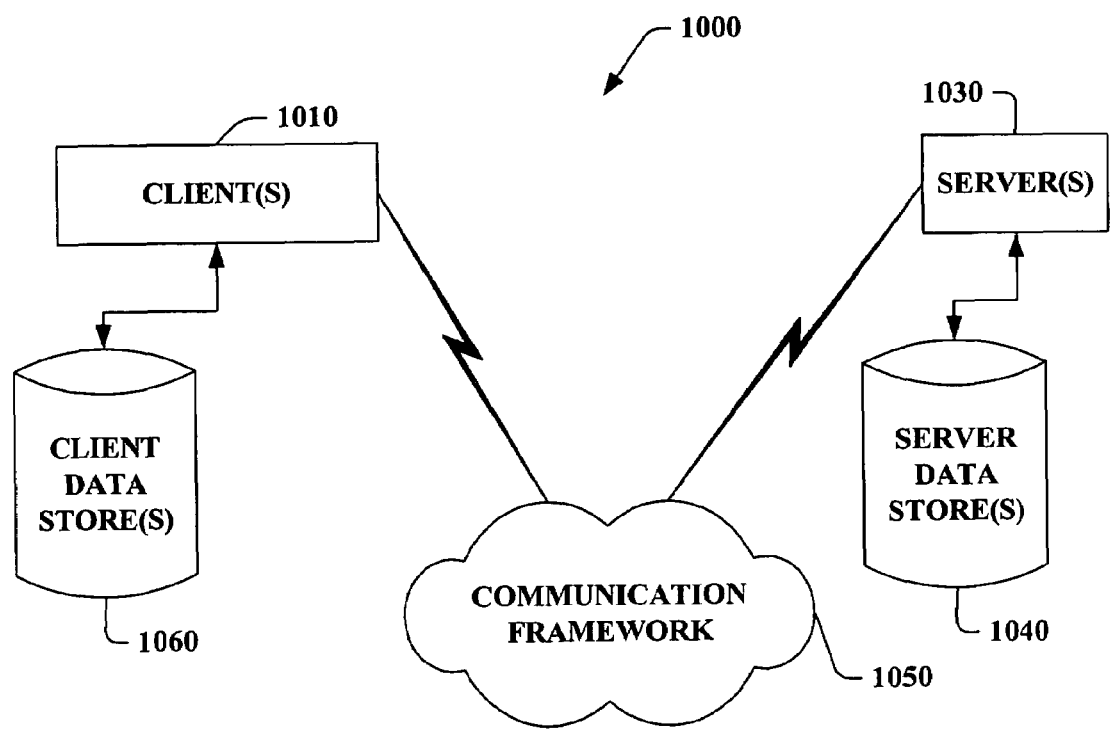
FIG. 10 is a schematic block diagram of a sample-computing environment with which the present invention can interact.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates background searching across a plurality of data sources, comprising:
   a background processor that analyzes a current user input to at least one application in real time to automatically determine terms for potential queries of interest from the current user input and constructs an implicit query from the terms, the determination of terms is based at least on a frequency of occurrence of the terms in the application;
   an implicit query interface associated with the application, the implicit query interface presents results retrieved upon a search employing the constructed queries to a user; and
   at least one model for estimating a value of the results of the constructed implicit query, so that a rendering of the results is suppressed when the value of the results falls below a threshold of value,
   wherein the threshold value is dynamically computed based on a user's context.

2. The system of claim 1, further comprising a context component to facilitate determination of the potential queries of interest.

3. The system of claim 2, context component employs at least one of a calendar, a detected application activity, detected application content, a log of previous activities, an explicit profile, a microphone, a camera, a face recognizer, and phone activity, to determine a user's current context.

4. The system of claim 1, further comprising a component to present alternative queries to a user.

5. The system of claim 1, further comprising a component to allow the user to select a different query from the potential queries of interest.

6. The system of claim 1, further comprising a component that predicts a value of alternative queries based upon data gathered from user logs.

7. The system of claim 1, further comprising a component to adjust a query interface from a user's data log.

8. The system of claim 1, further comprising a component that groups similar results together for display.

9. The system of claim 1, further comprising a component that processes content from at least one other application or from interaction history between applications.

10. The system of claim 1, further comprising a component that stores results of background queries and provides summaries available for review by users at future times.

11. The system of claim 10, further comprising a component that associates results of background queries with one or more aspects of the past focus of attention or user activities that occurred during or near the time that the results were generated, as labels for assisting users with recall of a context.

12. The system of claim 1, further comprising a plug-in component that analyzes what a user is reading or composing and automatically finds related items in an index of personal or shared information, which includes mail, calendar appointments, web pages, files, IM messages, database entries.

13. The system of claim 12, further comprising a wrapper to analyze context from other applications and to retrieve information from at least one other data source.

14. The system of claim 1, further comprising a peripheral display such as a sidebar attached to a current application which allows users to maintain their task focus and receive peripherally-presented suggestions.

15. The system of claim 14, further comprising quick links to related people or topics.

16. The system of claim 14, further comprising a component to control presentation parameters for display of results.

17. The system of claim 14, further comprising a feedback and logging component to asses the quality of returned search results.

18. The system of claim 15, further comprising a feedback and logging component that asses the quality of returned search results, consider at least one of a context, a query, properties relating to a list of results, and user interaction with the list of results.

19. The system of claim 18, further employing procedures for building logical or statistical models from logged data from one or more users that can be used to predict the quality of returned search results.

20. The system of claim 18, further comprising at least one interface to a content indexer or search engine to retrieve the search results.

21. The system of claim 1, further comprising a component to display an implicit query.

22. The system of claim 21, further comprising a method for displaying and selecting alternative suggestions.

23. The system of claim 21, further comprising a component for the user to modify the implicit query.

24. A computer readable medium having computer readable instructions stored thereon for implementing the components of claim 1.

25. A computer implemented information retrieval system, comprising the following computer components stored at least in a computer readable medium:
   means for performing a background analysis for content of at least one application;
   means for automatically determining relevant terms from a current user input based at least on a frequency of occurrence of the relevant terms in the application;
   means for constructing an implicit query from the determined terms,
      wherein the terms are determined based at least on their frequency of occurrence within the content of the application;
   means for retrieving information based at least in part on the implicit query;
   means for displaying the retrieved information;
   means for estimating a value of the information retrieved in response to the implicit query; and
   means for suppressing the retrieved information when the value falls below a threshold value,
      wherein the threshold value is dynamically computed based on a user's context.

26. A method for performing automated information retrieval, implemented at least in part by a computing device, comprising:
   analyzing a user's input to at least one application in real time;
   determining expressions of interest from the user's input within the application;
   automatically ranking the expressions based at least on a frequency of occurrence of the expressions in the application;
   performing a search in accordance with an implicit query created from the ranked expressions;
   retrieving results relevant to the implicit query;
   estimating a value of the result retrieved in response to the implicit query;
   dynamically computing a threshold value for the retrieved results based at least on a user's context; and
   suppressing a display of the retrieved results if the estimated value of the retrieved results falls below the threshold value.

27. The method of claim 26, further comprising adding or deleting words from the potential queries as the user interacts with the application.

28. The method of claim 26, further comprising counting a number of words in an application.

29. The method of claim 28, further comprising performing a look up on how many different documents in which a word occurs.

30. The method of claim 29, further comprising querying based upon a default number of words.

31. The method of claim 30, further comprising employing a probabilistic matching algorithm to determine a search result.

32. The method of claim 26, further comprising adding words to a query based on a score for query words computed as a function of the frequency of the terms in relevant activity-based content and the frequency of the term in a larger corpora under consideration.

33. The method of claim 26, further comprising adding words to a query based on a score for query words computed as proportional to the frequency of the terms in relevant activity-based content and inversely proportional to the frequency of the terms in a larger corpora under consideration.

34. The method of claim 26, further comprising adding words to a query based on a score for query words computed as being proportional to a monotonic increasing function of the frequency of the term in the document and inversely proportional to a monotonic-increasing function of the frequency of the term in a larger corpora under consideration.

35. The method of claim 26, further comprising at least one of allowing names of all or a subset of people involved in an application to be explicitly added as query terms; explicitly adding a subject of an application as query terms; and providing policies to exclude or include selected search criteria.

* * * * *